United States Patent [19]

Wells

[11] Patent Number: 4,923,276
[45] Date of Patent: May 8, 1990

[54] TAPERED OPTICAL FIBER TELESCOPE, TRACKING SYSTEM APPARATUS AND METHOD INCORPORATING TAPERED OPTICAL FIBER TELESCOPES

[75] Inventor: James A. Wells, Huntsville, Ala.

[73] Assignee: Teledyne Industries, Inc., Huntsville, Ala.

[21] Appl. No.: 309,675

[22] Filed: Feb. 13, 1989

[51] Int. Cl.⁵ .................. G02B 23/26; G01J 1/20; F41G 7/00
[52] U.S. Cl. .................. 250/206.2; 350/96.25; 350/320; 350/96.26; 250/227.28; 250/203 R; 244/3.16; 244/3.18
[58] Field of Search ............... 350/96.10, 96.15, 96.24, 350/96.25, 96.26, 320, 537, 538; 250/227, 203 R; 244/3.15, 3.16, 3.18

[56] References Cited

U.S. PATENT DOCUMENTS

| | | | |
|---|---|---|---|
| 2,992,587 | 7/1961 | Hicks et al. | 88/1 |
| 3,187,627 | 6/1965 | Kapany | 88/39 |
| 3,329,818 | 7/1967 | Woehl | 250/203 |
| 3,539,814 | 11/1970 | Lillestrand et al. | 250/203 |
| 3,599,001 | 8/1971 | Rolnik | 350/96.25 |
| 3,801,181 | 4/1974 | Kitano et al. | 350/96 R |
| 4,099,833 | 7/1978 | Tosswill | 350/96.25 |
| 4,205,901 | 6/1980 | Ramsay et al. | 350/96.31 |
| 4,389,085 | 6/1983 | Mori | 350/96.10 |
| 4,397,559 | 8/1983 | Gatewood | 356/404 |
| 4,641,931 | 2/1987 | Loy | 350/538 |
| 4,650,279 | 3/1987 | Magee | 350/96.24 |
| 4,671,605 | 6/1987 | Soref | 350/96.15 |
| 4,678,332 | 7/1987 | Rock et al. | 356/328 |
| 4,697,867 | 10/1987 | Blanc et al. | 350/96.10 |
| 4,698,084 | 10/1987 | Severijns et al. | 65/3.11 |
| 4,721,859 | 1/1988 | Lewis | 250/566 |
| 4,790,641 | 12/1988 | Halldorsson | 350/537 |
| 4,828,348 | 5/1989 | Pafford | 350/537 X |

Primary Examiner—William L. Sikes
Assistant Examiner—Brian M. Healy
Attorney, Agent, or Firm—Beveridge, DeGrandi & Weilacher

[57] ABSTRACT

An optical fiber telescope is disclosed as including an optical train having a plurality of tapered optical fibers arranged in a plurality of cascading stages. A collecting stage provides the aperture for the telescope and has an output for transmitting light to a terminal stage located downstream of the collecting stage. The input of the terminal stage is optically coupled to the output of the collecting stage and provides the optical output for the telescope according to the invention. Further disclosed is a telescope-based tracking system incorporating tapered optical fiber telescopes in accordance with the present invention. Output light from each telescope of the system is received by a detecting device which generates a signal representative of information contained in the received light. This signal is applied to a determining device which, for example, determines the position of the object.

38 Claims, 5 Drawing Sheets

TAPERED OPTICAL FIBER TELESCOPE, TRACKING SYSTEM APPARATUS AND METHOD INCORPORATING TAPERED OPTICAL FIBER TELESCOPES

BACKGROUND OF THE INVENTION

The present invention relates to an optical fiber telescope comprising an optical train wherein a plurality of optical fibers are arranged in cascading stages which include a collecting stage for collecting light in a field of view and a terminal stage located downstream of the collecting stage for receiving light from the collecting stage and passing the collected light through to an optical train output.

Conventional telescope tracking systems are characterized by a number of shortcomings which the optical fiber telescope and the optical fiber telescope-based tracking system of the present invention overcome. Such shortcomings arise as a result of the prior art telescopes utilized in such systems. According to U.S. Pat. No. 3,329,818, known photo-optical camera systems for searching, locating and tracking distant objects such as orbiting satellites and space vehicles generally have large aperture optical systems combined with special tracking apparatus. The patentee points out that such systems have a relatively small field of view and therefore are characterized by a lower probability of target location. Accordingly, U.S. Pat. No. 3,329,818 discloses a photoelectric tracking system including a facet-element, compound optical system comprising a plurality of telescopes. The patentee states that the facet-element, compound optical system makes it possible to have a comparatively wide field of view associated with a long focal length with reduced distortion and aberration. In a preferred embodiment, U.S. Pat. No. 3,329,818 discloses an arrangement of conventional refractor telescopes that provide optical images to associated image orthicon tubes which in turn apply video signals to a camera control system, an array of oscilloscope tubes, and a camera means.

Other prior art optical telescope-based tracking systems utilizing conventional telescopes have been directed to improved apparatus for receiving optical information from the telescope, improved apparatus for converting the received optical information into useful form, and improved apparatus for recording the converted information. For instance, U.S. Pat. No. 4,397,559 discloses a system which converts information carried by electromagnetic radiation into a permanent record. The patentee states that the telescope may be any suitable type and that a refractor telescope was used in reducing to practice an embodiment of the invention.

U.S. Pat. Nos. 3,329,818 and 4,397,559 are representative of prior art systems that rely upon conventional telescopes which require precision optical elements and mounting means for maintaining the optical elements in precise alignment. The former patent discloses a telescope array to increase the field of view and thereby increase the probability of locating the object to be tracked. However, such an array is relatively expensive and very heavy due to the large, high quality mirrors and lenses required for the several telescopes. Also, conventional telescopes are adversely affected by mechanical vibrations, high "g" forces and aerodynamic pressures. Further, conventional telescopes are generally very difficult to design to be resistent to nuclear radiation, commonly known as "hardening" against nuclear radiation. Conventional telescopes also are susceptible to catastrophic failure as a result of damage to the precision optical elements.

There have been improvements in optical systems by providing optical fibers in the optical train of the system. For instance, U.S. Pat. No. 4,641,931 shows a dual magnification telescope including a conventional objective, an optical fiber array, an intensifier tube having an optical fiber input and an eyepiece. The optical fiber array divides the field of view into two portions by means of a bundle of straight fibers and a bundle of tapered fibers which provide a magnification which is less than unity. By so reducing the magnification, the field of view can be increased for viewing relatively close objects.

U.S. Pat. Nos. 2,992,587; 3,187,627; and 3,801,181 show various optical fiber image transfer means having magnifying or demagnifying properties. U.S. Pat. No. 2,992,587 is related to a tapered optical fiber image transfer device wherein the object to be viewed is placed in close proximity to the end of the fiber bundle. U.S. Pat. No. 3,187,627 provides a magnifying tapered fiber bundle as a lens element in a microscope to reduce distortion and improve resolution. U.S. Pat. No. 3,801,181 discloses object lens elements with particular geometries and properties for use in various optical instruments such as fiberscopes, compound lens elements, and optical transmission devices.

Still further, U.S. Pat. No. 4,650,279 relates to a fiber optic lens adapted to connect two physically remote telescopes. Yet other U.S. patents relating to optical elements and optical systems incorporating optical fibers are U.S. Pat. Nos. 4,205,901; 4,671,605; 4,678,332; 4,698,084; and 4,721,859.

SUMMARY OF THE INVENTION

The present invention pertains to a tapered optical fiber telescope comprising tapered optical fibers arranged in a plurality of cascading stages and to telescope-based tracking systems including one or more optical fiber telescopes according to the invention. The optical fiber telescope of the instant invention has an optical train comprised of a plurality of stages. A collecting stage provides the aperture for the telescope. The collecting stage includes one or more bundles of tapered optical fibers with fibers oriented so that their relatively large area ends collect incoming light from an object under surveillance and their relatively small area ends serve as light output means for the collecting stage. The aperture size of the optical fiber telescope according to the present invention is determined by the area of the input ends of the individual tapered optical fibers in the collecting stage and the number of such fibeers arranged in the bundle or bundles forming the collecting stage.

Downstream of the collecting stage, one or more intermediate stages may be provided in optical connection with the collecting stage. Each consecutive downstream intermediate stage comprises successively fewer optical fibers. Finally, a terminal stage, connected to the last intermediate stage, is the output stage for the optical train of the telescope. The terminal stage might have only one tapered optical fiber. In the preferred embodiments of the telescope and telescope-based tracking system of the present invention, other optical elements such as an objective and/or eye piece are not necessary.

Due to the tapered contour of the individual fibers in the stages and to the concatenation of the cascading stages, the collected light at the input of the telescope is intensified as it is transmitted through the optical train thereof. Each tapered optical fiber provides a greater optical flux density at its output end than its input end as the incoming light received at the relatively larger input end is conducted through the fiber and output at the relatively smaller area output end. In the preferred embodiments, this "cone condensing" effect of the individual tapered optical fibers is multiplied by the number of tapered optical fibers in each stage connected to the input end of a fiber in the next downstream stage, with this multiplication being repeated for all stages in the telescope optical train. A relatively high intensity optical signal is supplied at the output of the terminal stage.

Generally, a tracking system according to the present invention includes the disclosed tapered optical fiber telescope and a detecting means optically coupled to the output of the telescope for detecting light transmitted therefrom. Preferably, the detecting means is of the type which generates information signals representative of the information in the light collected and transmitted by the telescope, and the tracking system comprises means responsive to such information signals for determining, for example, the position and velocity of a target object in the telescope field of view. In the preferred embodiments, the determining means comprises a digital computer and the detecting means comprises both an opto-electrical converter such as a photodetector for converting the intensified output light from the telescope terminal stage to electrical signals and an analog-to-digital converter for providing suitable digital signals to the computer. The computer in turn determines a coordinate position of the object under surveillance for a particular time. The computer also determines and stores data relating to the speed and direction of the target object. A recording means may be provided for providing permanent records of the data generated and stored by the computer. Preferably, a sweep control circuit also is provided under the control of the computer to scan the telescope or telescopes of the system across a selected section of sky.

In an alternative preferred embodiment of the tracking system according to the invention, a plurality of optical fiber telescopes are arranged in at least two distinct arrays. The arrays are physically separated from each other whereby a video generator generates pseudo three dimensional images representative of non-point source target objects. This embodiment likewise comprises a computer and sweep control means for respectively determining the instantaneous position and path of the object under surveillance and for regulating the telescope arrays to synchronously scan a selected section of sky.

Both the tapered optical fiber telescope and the tracking systems of the present invention, which feature an optical train comprised of plural, cascading stages of tapered optical fibers, have enlarged fields of view that are obtained at substantially reduced cost. The elements of the telescope and the telescope-based tracking systems according to the present invention are lightweight and comparatively resistant to damage. The risk of catastrophic failure to the system is greatly reduced due to the large number of optical fibers utilized in the telescope and tracking system of the invention. The disclosed telescope and tracking systems are relatively immune from mechanical failure.

Generally, an optical fiber telescope according to the present invention comprises an optical train wherein a plurality of optical fibers are arranged in cascading stages. Each stage has an input and an output. The stages include a collecting stage for collecting light in a field of view at its input and a terminal stage, located downstream of the collecting stage. The input of the terminal stage is optically coupled to the output of the collecting stage. The terminal stage receives collected light from the collecting stage to provide the optical output of the telescope.

A tracking system in accordance with the present invention comprises one or more optical telescopes, each having an optical train that includes a plurality of tapered optical fibers arranged in cascading stages and each stage having an input and an output. The stages include a collecting stage for collecting light in a field of view at the input thereof and a terminal stage located downstream of the collecting stage. The input of the terminal stage is optically coupled to the output of the collecting stage to transmit the collected light to a detecting means for detecting such. Preferably, the detecting means provides an information signal representative of the information contained in the transmitted light. Means responsive to the information signal are provided for determining the position and location of the object under surveillance.

An alternative system for tracking distant objects according to the present invention comprises a first telescope array spaced apart from a second telescope array. Each array likewise comprises a plurality of optical fiber telescopes with an optical train formed by a plurality of tapered optical fibers arranged in cascading stages. Similarly, the stages include a collecting stage for collecting light in a field of view at its input and a terminal stage, located downstream of the collecting stage, with its input optically coupled to the output of the collecting stage. Each of a plurality of detecting means is optically coupled to the output of an optical fiber telescope associated with it to detect light collected by such telescope. Each detecting means comprises an opto-electrical converter for producing an electrical information signal representative of the light supplied to it. Video generator means are provided for generating a video image corresponding to a tracked object based upon the information signals from the several opto-electrical means.

BRIEF DESCRIPTION OF THE DRAWINGS

Further aspects and features of the present invention will be even more apparent from the following detailed description and drawings in which like parts bear like reference numerals, and the appended claims. In the drawings:

FIG. 2 shows a preferred arrangement, in bundles, of the tapered optical fibers for the optical telescope of FIG. 1;

DETAILED DESCRIPTION OF THE PREFERRED EMBODIMENTS

Figure 1:
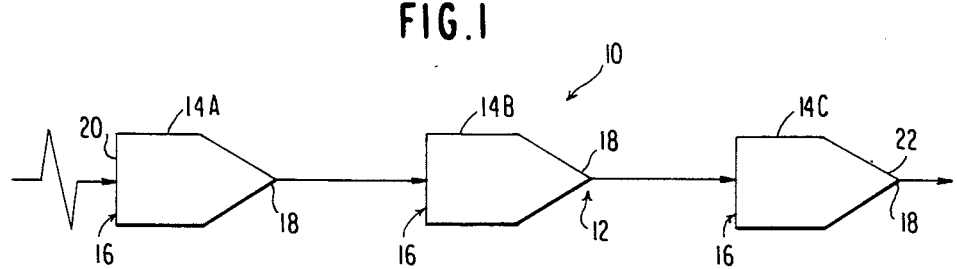
FIG. 1 is a block-diagram of a preferred embodiment of a tapered optical fiber telescope according to the present invention.

An optical fiber telescope 10 according to the present invention is shown in block diagram form in FIG. 1. Telescope 10 is shown as comprising an optical train 12 having three cascading stages 14 which are individually identified by reference characters 14A, 14B and 14C. Each stage 14A, 14B, and 14C in turn comprises at least one conventional tapered optical fiber to be described in more detail infra. Where the stages 14A, 14B, and 14C have a plurality of tapered optical fibers, the fibers are arranged in one or more bundles as also will be discussed further in the following. It is to be understood that while exemplary telescope 10 has three such stages, any desired number of cascading stages could be provided to form the optical train 12 thereof. Two to four stages would suffice for most applications.

Each stage 14A, 14B, and 14C has an input region generally identified by reference numeral 16 and an output region identified by 18 for providing direct optical coupling between adjacent stages. As illustrated in FIG. 1, the input region 16 of stage 14A provides a light collection area or aperture for the optical train 12 of telescope 10 and, for convenience, hereinafter will be referred to as telescope input or aperture 20. A light output for the optical train is identified by reference numeral 22. Conventional eyepieces or objective lens are not necessary at either telescope output 22 or aperture 20 respectively.

Figure 2:
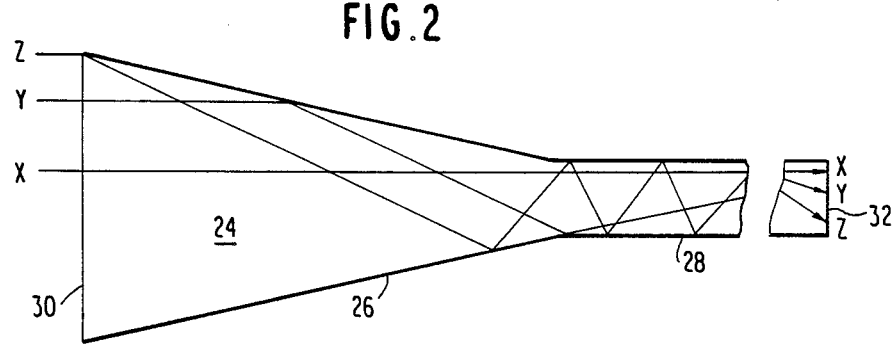
FIG. 2 is a schematic view showing a tapered optical fiber for use in the preferred telescope of FIG. 1.

In the preferred embodiments, stages 14A, 14B, and 14C of exemplary telescope 10 are formed with tapered optical fibers of the type shown in FIG. 2. Each tapered optical fiber 24 has a frusto-conical portion 26 connected to a cylindrical portion 28. The frusto-conical portion could have any desired length and taper. The cylindrical portion 28 also could have any desired length and corresponding diameter, and, as understood by one of ordinary skill in the art, could be integrally formed with frusto-conical portion 26 or optically coupled thereto according to known optical coupling techniques.

Optical fiber 24 terminates in a relatively large-area end face 30 and a relatively small-area end face 32. Fibers 24 are oriented so that the larger area end face 30 is the light input end for each tapered optical fiber 24 while the smaller area end face 32 is the light output end of the fiber. Generally, the tapered optical fibers making up the intermediate stage or stages would have substantially flat faces 30 and 32. On the other hand, the large-area end face 30 of the fibers in the first or "collecting" stage 14A and, for instance, the small-area end face of the fiber (or fibers) making up the last or "terminal" stage 14C might have a configuration other than flat and might be beveled or curved depending upon particular applications of the telescope. Tapered optical fiber 24 for use in the several stages of telescope 10 are fabricated from conventional core and cladding materials which preferably comprise plastic and/or high strength glass to ensure extra strength and durability.

FIG. 2 is useful in understanding the photon "flux condensing" action inherent in representative tapered optical fiber 24 which is shown as receiving light at its input end face 30 and passing the collected light to its output end face 32. Three rays x, y, and z represent light beams which are substantially normal to input end face 30 and which are incident at different radial locations thereon. Light ray x, incident near the axial center of end face 30, passes directly through frusto-conical portion 26 and cylindrical portion 28 to output end face 32. Rays y and z, incident on end face 30 near the outer radial boundary thereof, are internally reflected in fiber 24 and are thereby transmitted from the fiber input 30 to the output 32 without significant optical energy loss. Tapered optical fibers 24 thus serve as "cone channel condensers" wherein electromagnetic energy received at their inputs undergoes a "condensing action" so that the photon flux density through the fiber increases as light received at end face 30 is transmitted downstream through frusto-conical portion 26 to cylindrical portion 28.

Preferred tapered optical fibers 24 also are characterized by their property of absorption of incident rays which are not substantially normal to end face 30. As discussed immediately above, fibers 24 will pass light rays which are incident normal thereto with minimal absorption. However, rays which are incident on end face 30 at an angle which is more than a few degrees different from the normal will be substantially absorbed by the optical fiber.

Figure 3:
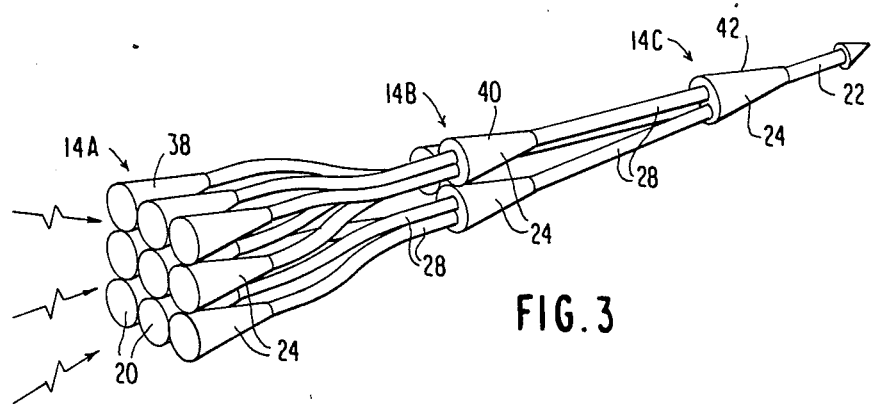

FIG. 3 depicts a preferred arrangement of the tapered optical fibers 24 in the stages 14A, 14B and 14C of optical telescope 10 shown in FIG. 1. In FIG. 3, stage 14A is shown as comprising nine optical fibers 24 provided in a generally-rectangular 3×3 bundle 38. Stage 14B comprises a triangularly-shaped bundle 40 of three tapered optical fibers while stage 14C is shown as comprising a single-fiber "bundle" 42. Stages 14A, 14B, and 14C thus cascade with stage 14A generally comprising the largest number of fibers 24 and each successive stage 14B and 14C, optically coupled downstream of stage 14A, having successively fewer fibers. As a result, the optical train 12 of preferred exemplary telescope 10 functions to multiplex light transmitted by the various fibers of the various stages 14A, 14B and 14C. The photon "condensing" action of each individual optical fiber is amplified according to the number of fibers in each of the plurality of stages 14 of optical train 12. Light intensity at the output of the optical train is increased by increasing the number of tapered optical fibers in each stage and/or increasing the number of stages. The number of cascading stages 14 is selected to optimize the output energy at the optical train output 22 for a selected observation target according to the target range and target intensity. It is stressed that while in FIG. 3, each of stages 14A through 14C is shown as comprising a single bundle of optical fibers, i.e., a rectangular, 3×3 bundle for collecting stage 14A, one or more of the stages could comprise a plurality of fiber bundles as well.

As mentioned briefly in the foregoing, the input region 16 of collecting stage 14A provides the "aperture" 20 for optical train 12. Aperture 20 determines the instantaneous field of view of telescope 10 which thus depends on the number of fibers 24 in the fiber bundle forming collecting stage 14A, how the individual fibers are arranged in the bundle, and the geometry of the tapered portion 26 of each fiber. It is also contemplated that while collecting stage 14A, shown in FIG. 3, comprises a single 3×3 bundle 38, a collecting stage (not shown) could be provided with a plurality of such bundles to have a still larger field of view and a greater output light intensity. Also, it should be appreciated that while in FIG. 3 the fibers 24 in each stage 14A, 14B, and 14C are shown as having input end faces 30 of generally uniform size, different fibers in each stage could have end faces with different sizes to permit tight clustering of the bundled fibers and thereby reduce the sizes of interstices between adjacent fibers.

With particular reference again to FIG. 3, the actual interconnections between the respective bundles 38, 40 and 42 of stages 14A, 14B and 14C are provided by the cylindrical portions 28 of tapered optical fibers 24. Thus, the fiber's cylindrical portions 28 can have any desired length to connect the output ends of the fibers of an upstream stage to the input ends of the fibers of its associated downstream stage. The fibers in successive stages thus are bonded in end-to-end relation. Conventional optical matching materials are used to make the direct end-to-end connections between associated fibers of adjacent stages.

Figure 4:
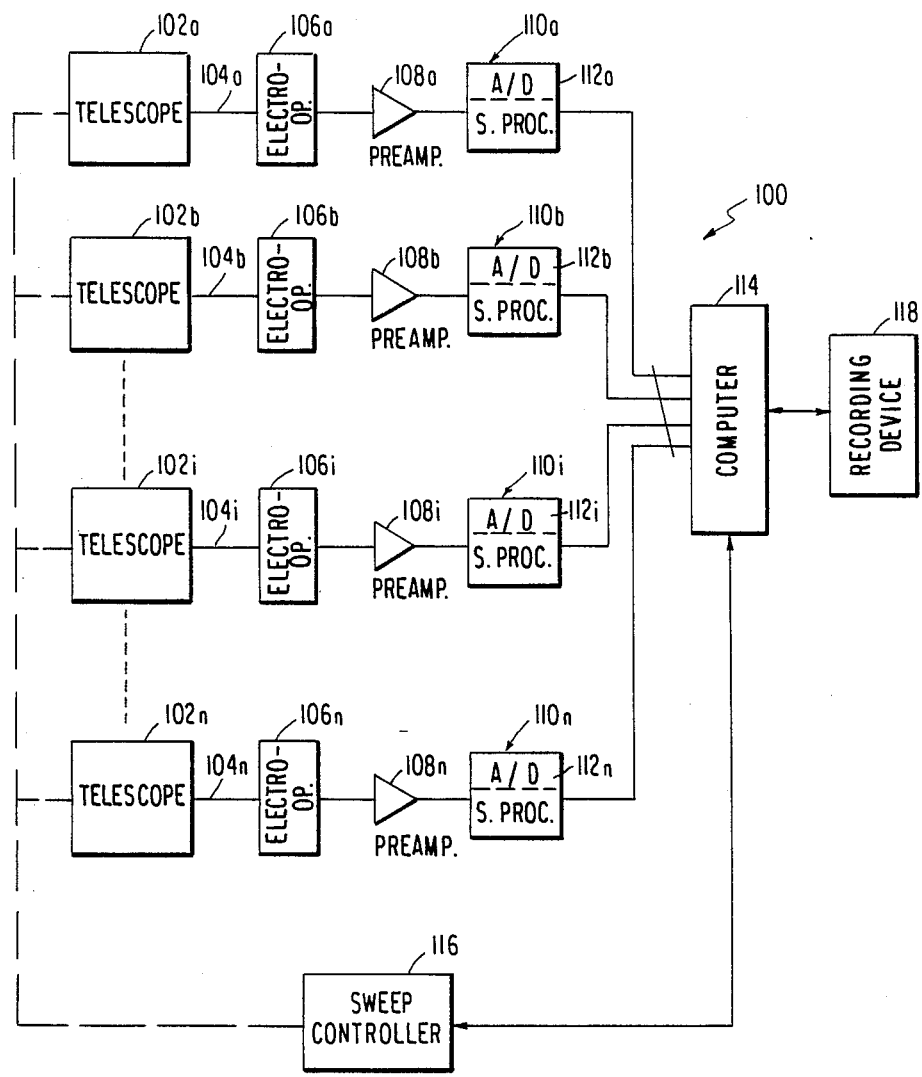
FIG. 4 is a block diagram of a tapered optical fiber telescope tracking system according to the present invention.

A tapered optical fiber telescope-based tracking system 100 according to the present invention is shown in block diagram form in FIG. 4. System 100 comprises a plurality of multi-stage, tapered optical fiber telescopes 102 of the type in accordance with the instant invention. In FIG. 4, system 100 is shown to have "n" such telescopes which are individually identified as telescopes 102a through 102n. Optical connecting means, for example conventional cylindrical optical fibers or light pipes 104a through 104n, connect the output of each telescope 102a through 102n to an associated opto-electrical detecting means 106a through 106n. Detecting means 106a through 106n comprise conventional opto-electrical conversion devices for producing electrical signals representative of the information provided by the intensified light collected and transmitted by telescopes 102a through 102n. Outputs from the detecting means 106a through 106n are applied to the input of their associated preamplifiers 108a through 108n for sufficient amplification of the electrical signals from the detecting means. Amplified signals from preamplifiers 108a through 108n are applied to corresponding signal processors 110a through 110n. Each of signal processors 110a through 110n in turn comprises an analog-to-digital-converter 112a through 112n. Output from each of the signal processors 110a through 110n is applied to the input of a central computer 114. Computer 114 also communicates with a sweep controller 116 which is mechanically coupled to each of telescopes 102a through 102n to move them according to a desired scanning pattern.

Each of telescopes 102a through 102n comprises at least a collecting stage and a terminal stage generally as discussed supra in connection with FIGS. 1 through 3. The total number of stages in each telescope 102a through 102n, the particulr arrangement of the fibers in bundles in each stage and the total number of fibers in each stage likewise, as appreciated by one of ordinary skill in the art, are selected according to the application of system 10.

Each opto-electrical detecting means 106a through 106n receives relatively increased intensity output light from its associated telescope 102a through 102n. Preferably, each detecting means 106a through 106n comprises a conventional photodetector which generates electrical signals that indicate the intensity of the light applied to its photosensitive surface by its associated telescope. As is appreciated by those of ordinary skill in the art, the various detecting means 106a through 106n could comprise other opto-electrical devices as well. for example devices for providing electrical signals indicative of the wavelength of the light collected by the telescopes 102a through 102n.

Computer 114 eventually receives the information transmitted by the electrical output signals of detecting means 106a through 106n. Since the signals from the detecting means 106a through 106n generally are weak. they first are amplified by preamplifiers 108a through 108n before they are passed on to signal processors 110a through 110n. Computer 114 then receives processed electrical signals from each of the signal processors 110a through 110n provided in the data path from the detecting means 106a through 106n and stores and interprets the data. In the preferred embodiments, computer 114 is a digital computer and so processors 110a through 110n comprise analog-to-digital convertors 112a through 112n along with suitable amplifying circuits, filters, and other conventional components well known to those of ordinary skill in the art for converting amplified analog output signals from opto-electrical detecting means 106a through 106n for interpretation by computer 114.

According to the preferred embodiment, computer 114 receives digital data indicative of at least the intensity of the light collected and furnished by the individual telescopes 102a through 102n. Computer 114 analyzes the light intensity data. From the intensity information, the computer 114 can be made to determine the speed and direction of the object under surveillance, according to well known methodology. Thus, for example, it can be detected whether an object tracked by system 100 is on a collision course or an intercept course with another object. Then, the recording means 118 produces a tangible record of the information obtained during surveillance of the object. Recording means 118 could comprise a printer, a monitor for providing visual displays, a magnetic tape, a magnetic disk, an optical disk or other like apparatus for producing permanent records.

Preferred system 100 also comprises a conventional sweep controller 116 to set a sweep range for the array of telescopes 102a through 102n. According to the preferred embodiment, each telescope 102a through 102n is carried upon a movable mount (not shown) which is controlled by sweep controller 116. It is contemplated that sweep controller 116 is a conventional servo mechanism which causes each telescope 102a through 102n to move according to a programmed scan pattern. Sweep controller 116 is programmed to direct each telescope of the system telescope array toward a particular section of sky to center the field of view at such sky section. Sweep controller 116 then controls the telescopes in the array to reciprocally scan a much larger section of sky to provide a correspondingly larger scanning field of view. It is contemplated that sweep controller 116 controls each of telescopes 102a through 102n independently to cause them to scan at a uniform rate.

The apertures (i.e. the collecting stages) of telescopes 102a through 102n can be arranged in any desired array to provide a particular instantaneous field of view. Each of telescopes 102a through 102n provides a portion of the total instantaneous field of view of the telescope array. For most applications, telescopes 102a through 102n would be arranged in a rectangular array.

Figure 5:
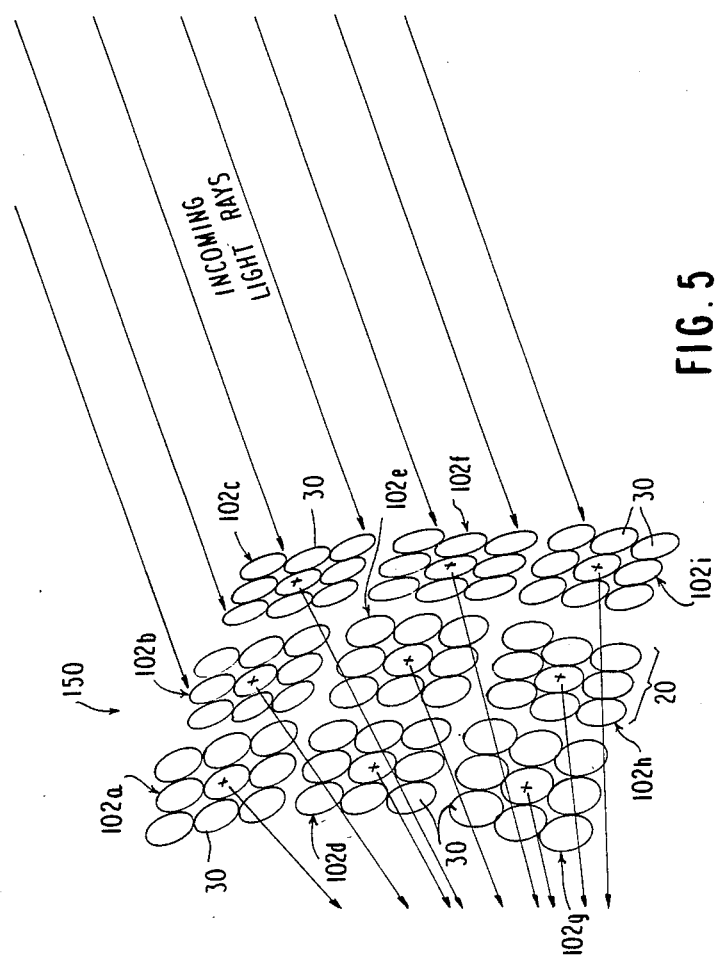
FIG. 5 is a sectional view in perspective from behind the apertures of a preferred rectangular, 3×3 array of telescopes according to the present invention.

FIG. 5 illustrates a preferred arrangement of nine telescopes referred to as 102a through 102i in a rectangular array 150. FIG. 5 is to be understood as a perspective view from a position behind the collecting stages, indeed behind the optical fiber input end faces 30 of the nine telescopes 102a through 102i. Only the eighty-one optical fiber input end faces 30 of the nine telescopes 102a through 102i are illustrated. The arrangement of telescopes in FIG. 5 is suitable for tracking objects in the sky from the ground.

Incoming light to the telescope array 150 is shown as passing through a central tapered optical fiber of each telescope 102a through 102i. Of course, parallel light rays likewise will be incident on the surrounding eight fibers of each telescope in the same way. It is appreciated from FIG. 5 that the nine collecting stage, fiber-input end faces 30 of each of telescopes 102a through 102i define a plane which is perpendicular to the axial axis through the nine collecting stage fibers. This axis with which the collecting stage optical fibers of each telescope are aligned is known as the pointing direction of that particular telescope.

Each of telescopes 102a through 102i in FIG. 5 has a different pointing direction. Usually, the angle of separation, that is, the angle formed between the pointing direction of any two adjacent telescopes in the array 150, is no more than a few degrees of arc and often would be no more than 1 degree. In rarer instances, for some applications, however, the angle of separation might exceed 3 degrees. It is the angle of separation between the adjacent telescopes which determines the sensitivity of the tracking system comprising telescope array 150. As the angle of separation is decreased, sensitivity is increased and therefore the accuracy of calculations for the tracked object's angular position is increased. On the other hand, as the angle of separation is decreased, the instantaneous field of view of the array is decreased. However, this can be offset by adjusting the sweep of the array under the control of sweep controller 116. If very precise calculations of the tracked object's angular position are not as important as a very large instantaneous field of view, the angular separation for the arrayed telescopes can be increased accordingly. It is contemplated that the sweep controller 116 is controllable to adjust the angles of separation between adjacent telescopes.

In FIG. 5, the central telescope 102e of array 150 is shown to have its pointing direction parallel with the incoming light rays. Thus, the incoming rays are normal to the individual collecting-stage optical fiber end faces 30 of telescope 102e. Since telescopes 102a through 102d and telescopes 102f through 102i are oriented at various angles of separation from telescope 102e, the parallel light rays are incident on their collecting stage, fiber end faces at angles different from the normal.

Due to the transmission-absorption characteristics of the individual tapered optical fibers, telescope 102e thus will transmit the greatest amount of light to its respective electro-optical detector (not shown in FIG. 5). The collecting-stage optical fibers of the remaining telescopes 102a through 102d and 102f through 102i absorb substantially more of the incident light and thus transmit less light in accordance with their angle of separation from telescope 102e.

Figure 6:
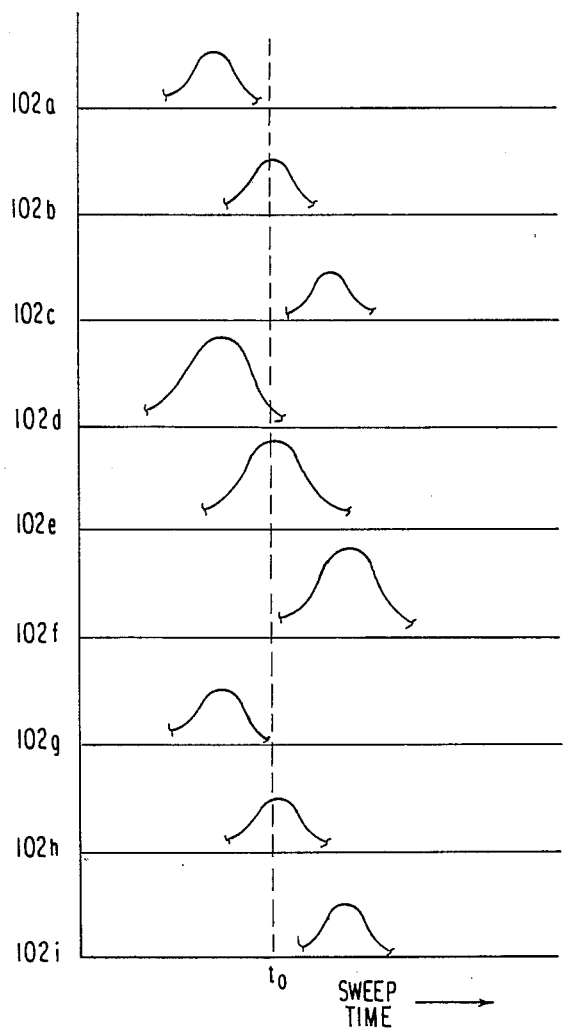
FIG. 6 is a diagram useful in understanding tracking of a target object under surveillance with the tracking system of FIG. 4 with n=9 telescopes arranged in the 3×3 array of FIG. 5.

FIG. 6 is a diagram useful in understanding tracking of an object with a tracking system 100 comprising nine optical fiber telescopes arranged in the preferred array of FIG. 5. Thus, reference will be made of FIGS. 4 through 6 and, for the following discussion, the number "n" (FIG. 4) will be nine, corresponding to the nine telescopes 102a through 102i illustrated in FIG. 5. FIG. 6 shows a series of pulse-shaped, signals output by the nine associated preamplifiers of such a nine telescope tracking system. The amplitudes of the pulses vary according to the intensity of the light that each detecting device receives from its associated telescope 102a through 102i. As the telescope array is controlled to scan across a section of sky by sweep controller 116, the individual telescopes 102 in the array will transmit more or less light from the tracked object according to their instantaneous alignment with the object. If, as is now well understood, at a time, $t_0$, telescope 102e is aligned so that light from the tracked object is substantially normal to it, telescope 102e will transmit the most intense light to its respective detecting means which in turn will register the intensity curve having a maximum amplitude as apparent from the portions of the intensity curves shown in FIG. 6. As scanning continues under the control of sweep controller 116, the aperture 20 of telescope 102e will be moved out of its alignment normal to the light from the object and the amplitude of its respective intensity curve will diminish in time. If, during this time, another telescope is moved into alignment normal with the object, its respective intensity curve likewise will present a maximum intensity curve. The amplitudes of these signals change in time depending upon the intensity of the target object, the position of the target, the velocity of the target across the scanned section of sky, and the selected rate of scanning. Using conventional techniques such as triangulation, computer 114 determines angular coordinates for the tracked object and the velocity of the object according to these varying signals representing light intensity.

While in FIG. 5, all the telescopes 102a through 102i are shown to have different pointing directions, it is, of course, possible for sweep controller 116 to align two or more telescopes in the same pointing direction and the remaining telescopes in the array to have pointing directions which are angularly separated from the aligned-pointing direction telescopes. For example, a substantially larger telescope array such as rectangular $10 \times 10$ array of one hundred telescopes might have a central, $8 \times 8$ sub-array of sixty-four telescopes which are all aligned in the same pointing direction and thirty-six telescopes, arranged about periphery of the central $8 \times 8$ sub-array, with pointing directions which are directed outwardly from those of the $8 \times 8$ sub-array. Alternatively, in a large telescope array, such as a $10 \times 10$ array, all of the telescopes could have angles of separation with respect to each other, however, the centermost telescopes might have very small angles of separation with the angle of separation between adjacent telescopes increasing from the centermost to the outermost telescopes of the array. Such an arrangement would provide a tracking system having an expanded field of view as a result of the outermost telescopes and increased sensitivity due to the centrally-located telescopes.

It further is to be understood that the telescopes could be arranged in still other arrays more particularly suited for different applications. For example, where system 100 is to be deployed in space for surveillance of satellites or the like in orbit around the earth, telescopes 102a through 102n in FIG. 4 could be arranged in an accurate pattern, corresponding to the curvature of the earth, for tracking objects orbiting a certain altitude above the horizon.

It also is contemplated that an alternative system formed entirely by optical elements could be implemented. In such an alternative system, an optics-based computer would be substituted for digital computer 114. Accordingly, suitable optical detecting, amplification and processing elements would be provided for transmitting the output of the tapered optical fiber telescopes according to the present invention to such optical computer.

Figure 7:
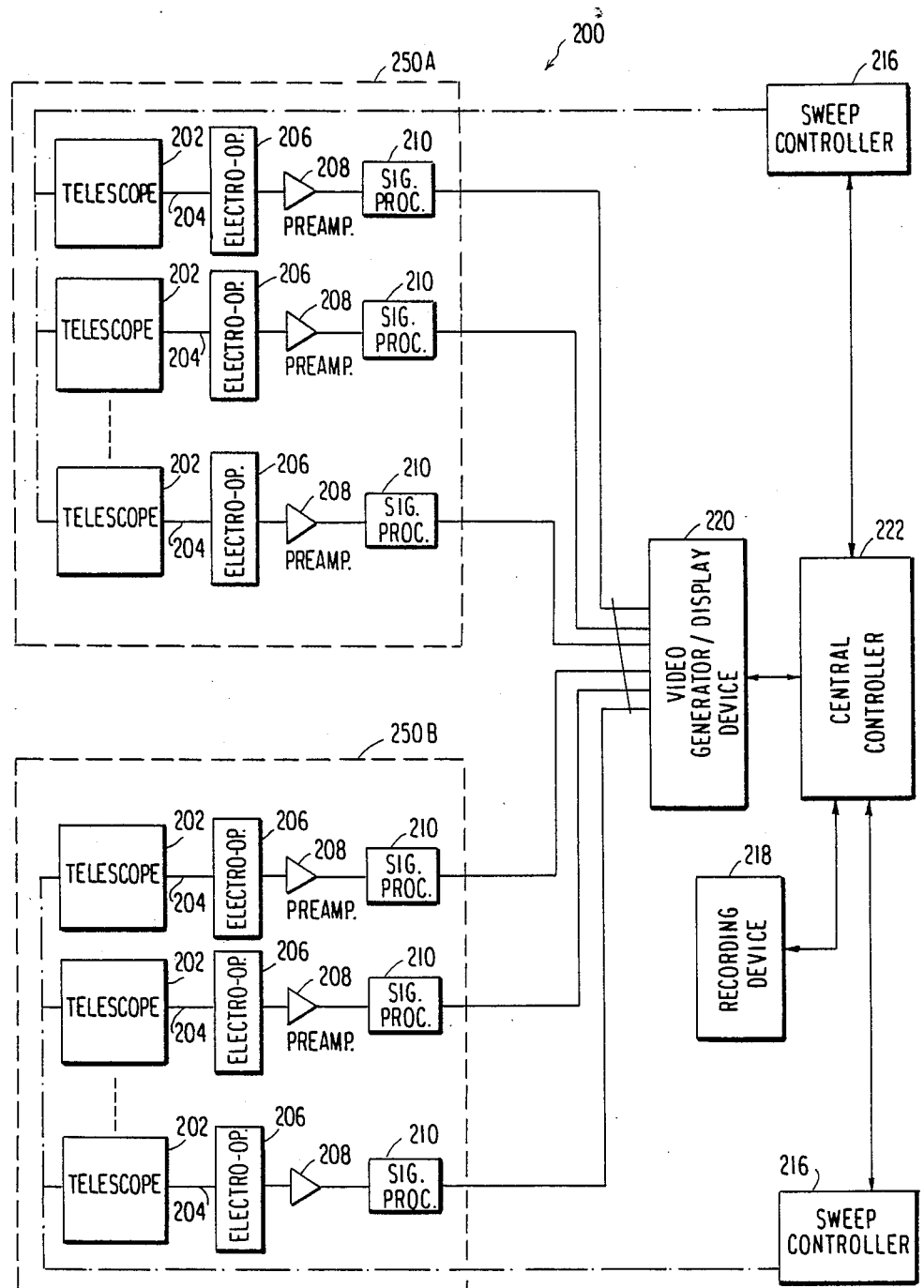
FIG. 7 is a block diagram of an alternative embodiment of a tapered optical fiber telescope-based tracking system in accordance with the present invention.

FIG. 7 is a block diagram depicting an alternative embodiment of the optical fiber telescope-based tracking system according to the present invention. In FIG. 7, system 200 is of the type especially suited for generating a video image corresponding to a target object under surveillance. System 200 differs from tracking system 100 primarily in the provision of at least two distinct telescope arrays 250A and 250B. Each array 250A and 250B likewise comprises a plurality of tapered optical fiber telescopes 202 having two or more stages as desired. As is understood by those of ordinary skill in the art, arrays 250A and 250B are remote from each other by a distance sufficient to permit generation of a 3-dimensional image representative of non-point source objects. Each tapered optical fiber telescope 202 of telescope arrays 250A and 250B likewise is optically coupled by conventional light pipes 204 or the like to an associated detecting means 206. Each detecting means 206 is connected to a preamplifier 208 for amplification of its output signals before the signals are applied to conventional signal processors 210. Processors 210 suitable process the signals before applying them to a video generator and display device 220 which provides a video representation of the tracked object. A central controller 222 is provided for regulating operation of the video device 220 and each of two sweep controllers 216 which likewise determine a scanning field of view and a sweep rate for each of telescope arrays 250A and 250B. Central controller 222 provides timing signals to the sweep controllers 216 to effect synchronous scanning of their associated telescope arrays 250A and 250B. Preferably, the central controller 222 comprises a computer for determining a coordinate location of a target object, the velocity of the object, and like data relating to the object. Central controller 222 then supplies data to a conventional recording device 218 for providing a permanent report.

Telescope 10 and the tracking systems 100 and 200 based thereon have several advantages over conventional telescopes and conventional telescope-based sensor and or tracking systems. Unlike conventional optical telescopes which require at least one precision optical surface sized to the aperture of the instrument, the tapered optical fiber telescope of the present invention distributes the collecting aperture over a number of relatively small diameter optical fibers to provide a field of view which can be increased simply by increasing the number of optical fibers in the collecting stage. Accordingly, the field of view for the telescope and telescope-based surveillance and tracking systems according to the present invention can be increased as desired without substantial increase in cost as is inherent in conventional optical telescopes and conventional telescope-based tracking systems. The field of view of the telescope and system of the present invention is increased even further when conventional sweep controlling means are provided to set the angle of separation between telescopes to desired values and then reciprocally scan such telescopes across a particular sector of sky.

The disclosed telescope and telescope-based tracking systems have several other advantages as well. For instance, the telescope and tracking system according to the invention, unlike conventional telescopes, are comparatively highly resistent to mechanical vibrations, high "g" forces and aerodynamic pressures. Unlike conventional telescopes, they readily can be made resistant to nuclear radiation or "nuclear hardened". Also, unlike conventional telescopes which are difficult to implement with light-weight materials and are usually comparatively heavy and expensive to build, the tapered optical fiber telescope offers improved optical, mechanical and nuclear-hardening properties with corresponding reductions in weight, cost and production time. Due to the high redundancy of the optical fibers arrayed in stages according to the invention, the resulting telescopes and telescope-based tracking systems are much less susceptible to catastrophic failure.

It is to be understood that there may be various changes and/or modifications to the tapered optical fiber telescope and tapered optical fiber telescoped-based tracking systems according to the invention which would be apparent to one of ordinary skill in the art. However, such changes and/or modifications still would result in a telescope or telescope-based tracking system within the scope of the invention as set forth in the claims.

What is claimed is:

1. An optical fiber telescope for concentrating light for tracking without need for forming an image of an object tracked, said telescope comprising an optical train formed of a plurality of tapered optical fibers arranged in cascading stages with each stage having an input and output, said stages including a collecting stage for collecting light in a field of view at its input and a terminal stage, located downstream of said collecting stage, with its input optically coupled to the output of said collecting stage for receiving collected light from said collecting stage and passing collected light through to the output thereof, the optical fibers of said collecting stage being arranged in at least one bundle, each upstream stage in said optical train having a greater number of tapered optical fibers than its adjacent downstream stage whereby said terminal stage provides concentrated light at its output without eyepiece or objective elements.

2. An optical fiber telescope as claimed in claim 1, wherein each said optical fiber has an axially enlarged portion with a relatively large end face and an axially narrowed portion with a relatively small end face.

3. An optical fiber telescope as claimed in claim 2, wherein said optical fibers of said stages upstream of said terminal stage are arranged in bundles.

4. An optical fiber telescope as claimed in claim 2, further comprising at least one intermediate stage located downstream of said collecting stage and upstream of said terminal stage for coupling said output of said collecting stage to said input of said terminal stage.

5. An optical fiber telescope as claimed in claim 1, wherein said terminal stage has only one optical fiber.

6. An optical fiber telescope as claimed in claim 2, wherein said relatively large end faces of said fibers of each stage downstream of an adjacent upstream stage are connected end-to-end to said relatively small end faces of associated fibers of said adjacent upstream stage.

7. An optical fiber telescope as claimed in claim 2, wherein said enlarged portion of said tapered optical fiber comprises a frusto-conical section and said narrowed portion comprises a cylindrical section.

8. A system for tracking distant objects, said system comprising:
   an optical telescope comprising an optical train including a plurality of tapered optical fibers arranged in cascading stages with each stage having an input and an output, said stages including a collecting stage for collecting light in a field of view determined by its input and a terminal stage located downstream of said collecting stage with the input of said terminal stage optically coupled to the output of said collecting stage, said terminal stage receiving collected light from said collecting stage and transmitting said collected light through to the output thereof, and
   detecting means, optically coupled to the output of said terminal stage, for detecting light collected by said telescope.

9. A system as claimed in claim 8, wherein:
   said system comprises a plurality of said telescopes, said telescopes being arranged in an array with at least two telescopes in said array having different pointing directions;
   said detecting means comprises opto-electrical converting means for providing an electrical information signal representative of the detected light; and
   said system further comprises means responsive to the information signal for determining the position of the object tracked.

10. A system as claimed in claim 8, wherein the angle of separation between the pointing directions of any two adjacent telescopes in said array is nominally between 0° and 3°.

11. A system as claimed in claim 10, wherein said angle of separation is nominally between 0° and 1°.

12. A system as claimed in claim 9, further comprising sweep control means for scanning said telescopes across a section of sky.

13. A system as claimed in claim 12, wherein said determining means comprises a digital computer, said system further comprising analog-to-digital convertor means connected to said converting means for converting the provided information signal to a digital signal and applying the digital signal to said digital computer.

14. A system as claimed in claim 13, further comprising recording means, connected to said computer, for providing an informational record.

15. A system as claimed in claim 8, wherein the tapered optical fibers of said telescope include a relatively large end face and an opposing relatively small end face, said relatively large end faces of the optical fibers of each stage downstream of an adjacent upstream stage being connected to the relatively small end face of associated fibers of said adjacent upstream stage.

16. A system as claimed in claim 15, wherein each upstream stage has a greater number of tapered optical fibers than its adjacent, downstream stage.

17. A system as claimed in claim 16, wherein said optical fibers of said stages upstream of said terminal stage are arranged in bundles.

18. A system for tracking distant objects, said system comprising:
   a first telescope array and a second telescope array, each of said arrays comprising a plurality of optical fiber telescopes comprising an optical train formed by a plurality of tapered optical fibers arranged in cascading stages with each stage having an input and an output, said stages including a collecting stage for collecting light in a field of view at its input and a terminal stage, located downstream of said collecting stage, with its input optically coupled to the output of said collecting stage for receiving collected light from said collecting stage and passing said collected light through to the output thereof, and a plurality of detecting means, optically coupled to the output of each associated optical fiber telescope for detecting light collected by said associated telescope, each said detecting means comprising opto-electrical means for producing an electrical information signal representative of the light output from an associated telescope; and
   video generator means for generating a video image corresponding to a tracked object based upon the information signals from said plurality of opto-electrical means.

19. A system as claimed in claim 18, further comprising means for determining a position of a tracked object in the field of view of said telescope arrays based upon the information signals from said opto-electrical means.

20. A system as claimed in claim 19, further comprising sweep control means associated with said arrays for controlling said telescopes of said arrays to reciprocally scan across a section of sky.

21. A system as claimed in claim 18, wherein in each of said arrays, at least two of said telescopes have different pointing directions.

22. A system as claimed in claim 20, wherein the angle of separation between the pointing directions of any two adjacent telescopes in each of said arrays is nomimally between 0° and 3°.

23. A system as claimed in claim 22, wherein said angle of separation is nominally between 0° and 1°.

24. A system as claimed in claim 18, wherein the tapered optical fibers of said telescopes each include a relatively large end face and an opposing relatively small end face, said relatively large end faces of the optical fibers of each stage downstream of an adjacent upstream stage being connected to the relatively small end faces of associated fibers of said adjacent upstream stage.

25. A system as claimed in claim 24, wherein each upstream stage has a greater number of tapered optical fibers than its adjacent downstream stage.

26. A system as claimed in claim 25, wherein said optical fibers of said stages upstream of said terminal stage are arranged in bundles.

27. A method of tracking a distant object, said method comprising the steps of:
   (A) directing an optical telescope at the object to place the object in the field of view of said telescope so that it receives light from the object, said telescope comprising an optical train including a plurality of tapered optical fibers arranged in cascading stages, said stages including a collecting stage for collecting light from the object and a terminal stage located downstream of said collecting stage with its input optically coupled to the output of said collecting stage to receive the collected light from the object, said terminal stage transmitting the collected light therethrough;

(B) detecting the light transmitted through said telescope terminal stage;

(C) providing information signals representative of the light transmitted by said terminal stage; and (D) determining the position of the object based upon said information signals.

28. A telescope array for tracking without need for forming an image of an object tracked, said array comprising tapered optical fiber telescopes forming of an optical train including a plurality of tapered optical fibers arranged in cascading stages to form an optical train with each stage having an input and an output, said stages including a collecting stage for collecting light in a field of view determined by its input and a terminal stage located downstream of said collecting stage with the input of said terminal stage optically coupled to the output of said collecting stage, said terminal stage receiving collected light from said collecting stage and transmitting said collected light through to the output thereof, the tapered optical fibers of each stage including a relatively large end face and an opposing relatively small end face, said relatively large end faces of the optical fibers of each stage downstream of an adjacent upstream stage being connected to the relatively small end face of associated fibers of said adjacent upstream stage, each upstream stage in said optical train having a greater number of tapered optical fibers than its adjacent downstream stage whereby each downstream stage successively delivers greater concentrated light at its output.

29. A telescope array as claimed in claim 28, wherein at least two telescopes in said array have different pointing directions.

30. A telescope array as claimed in claim 29, wherein the angle of separation between the pointing directions of any two adjacent telescopes in said array is nominally between 0° and 3°.

31. A telescope array as claimed in claim 29, wherein at least two telescopes have the same pointing direction.

32. A telescope array as claimed in claim 29, wherein the optical fibers of stages upstream of said terminal stage are arranged in bundles.

33. A telescope array as claimed in claim 29, further comprising sweep control means for scanning said telescopes across a section of sky.

34. A system of optical fiber telescope arrays for tracking distant objects, said system comprising:

at least a first telescope array and a second telescope array, each of said arrays comprising optical fiber telescopes comprising an optical train formed by a plurality of tapered optical fibers arranged in cascading stages with each stage having an input and an output.

said stages including a collecting stage for collecting light in a field of view at its input and a terminal stage, located downstream of said collecting stage, with its input optically coupled to the output of said collecting stage for receiving collected light from said collecting stage and passing said collected light through to the output thereof, the tapered optical fibers of said telescopes each including a relatively large end face and an opposing relatively small end face, said relatively large end faces of the optical fibers of each stage downstream of an adjacent upstream stage being connected to the relatively small end faces of associated fibers of said adjacent upstream stage, each upstream stage in each said optical train having a greater number of tapered optical fibers than its adjacent downstream stage whereby each successive downstream stage concentrates light received at its input.

35. A system as claimed in claim 34, wherein in each of said arrays, at least two of said telescopes have different pointing directions.

36. A system as claimed in claim 34, wherein in each of said arrays, at least two of said telescopes have the same pointing directions.

37. A system as claimed in claim 34, wherein the optical fibers of stages upstream of said terminal stages are arranged in bundles.

38. A system as claimed in claim 34, further comprising sweep control means associated with said arrays for controlling said telescopes of said arrays to scan across a section of sky.

* * * * *